United States Patent

[11] 3,588,208

[72] Inventor Thomas E. Kane
Westport, Conn.
[21] Appl. No. 859,443
[22] Filed Sept. 19, 1969
[45] Patented June 28, 1971
[73] Assignee Tek Bearing Company
Bridgeport, Conn.

[54] LOCKING DEVICE FOR ANTIFRICTION BEARING RING
5 Claims, 4 Drawing Figs.

[52] U.S. Cl. .................................................. 308/236
[51] Int. Cl. .................................................. F16c 35/06
[50] Field of Search ...................................... 308/236;
287/52.06, 52.08

[56] References Cited
UNITED STATES PATENTS
2,136,819 11/1938 Large ............................ 308/236

*Primary Examiner*—Fred C. Mattern, Jr.
*Assistant Examiner*—Frank Susko
*Attorney*—Harry B. Rook ABSTRACT: A cylindrical extension is provided at one or each end of the load-carrying raceway portion of the inner race ring of an antifriction bearing whose inner peripheral surface has a slip fit on a shaft; said extension has three slots spaced equidistantly circumferentially of the extension and extending longitudinally inwardly from the end of the extension to an area short of the raceway and beyond an external shoulder against which is adapted to abut a rigid steel ring having a slide fit on said extension and having a setscrew threaded therein to engage said extension at a point diametrically opposite one of said slots and centrally between the other two slots.

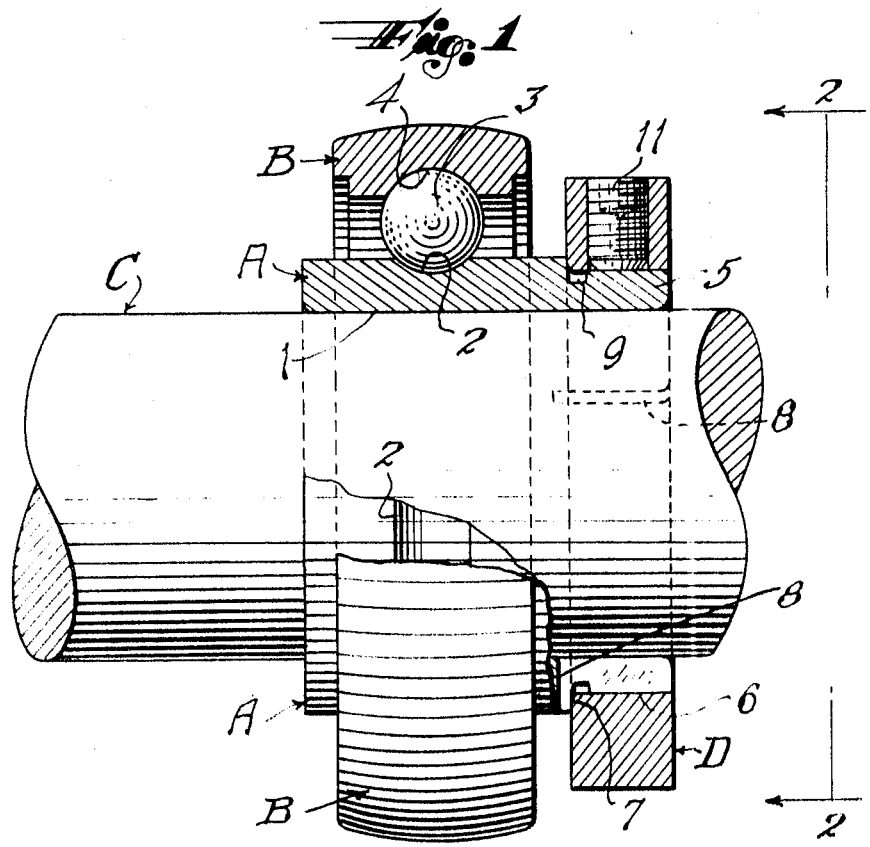
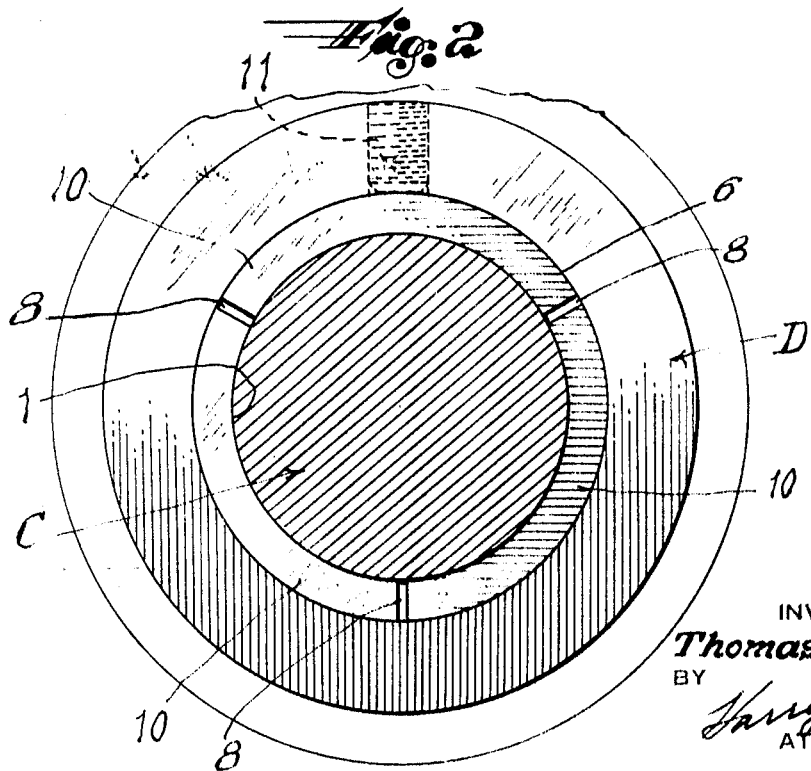

INVENTOR
Thomas E. Kane
BY
Harry B. Kook,
ATTORNEY

LOCKING DEVICE FOR ANTIFRICTION BEARING RING

BACKGROUND OF THE INVENTION

1. Field of the Invention

This invention relates to means for securing or locking on a shaft the inner race ring of an antifriction bearing.

2. The Prior Art

The prior art includes an inner race ring having a cylindrical extension provided with two or four or more slots, at one or both ends of its raceway portion, and means including a collar fitted over the slotted extension for the purpose of forcing said extension into firm clamping engagement with the shaft.

However, the prior art devices leave much to be desired, either because of their failure to achieve the desired result in a satisfactory manner, or because they cannot be relied on to clamp the race ring tightly enough on the shaft, or because they produce burrs or score marks on the shaft which interfere with the removal of the bearing from the shaft and the fitting of another bearing on the shaft, or because the devices are too complicated and expensive.

SUMMARY

The primary object of the present invention is to provide a novel and improved simple and inexpensive means for locking a race ring on a shaft, which overcomes the shortcomings of the prior art devices, and ensures the tight clamping the race ring on the shaft in a satisfactory manner, and does not cause burrs or score marks on the shaft.

An important feature of the invention is the formation in the coaxial cylindrical extension of the inner race ring, of three slots equidistantly spaced circumferentially of the extension and extending longitudinally inwardly to a zone short of the raceway portion, and fitting on said extension a rigid continuous ring which has a setscrew threaded therein to engage said extension at a point diametrically opposite one slot and between the other two slots, whereby tightening of the screw will cause the portions between the slots to be drawn into firm concentric clamping engagement with the shaft.

BRIEF DESCRIPTION OF THE DRAWINGS

For a more complete understanding of the invention, reference may be had to the following description in conjunction with the accompanying drawings in which:

FIG. 1 is a composite front elevation the central longitudinal sectional view of a ball bearing, a shaft and a coupling or a locking means embodying the invention;

FIG. 2 is an end elevation thereof taken from a plane of the line 2–2 of FIG. 1;

DESCRIPTION OF THE PREFERRED EMBODIMENT

Figure 3:
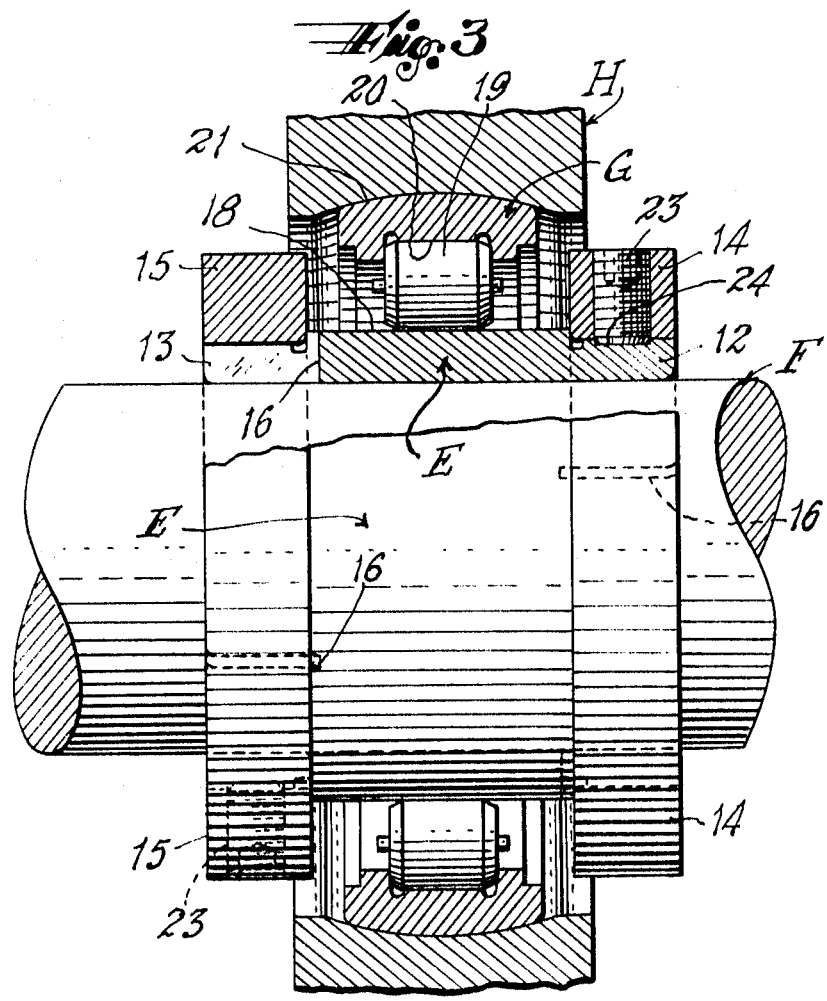
FIG. 3 is a view similar to FIG. 1 of a roller bearing having coupling or locking means at both ends of the inner race ring, the bearing being schematically illustrated as mounted for self-alignment in a housing.

Referring first to FIGS. 1 and 2 the invention has been shown as embodied in a ball bearing which has an inner race member or ring A and an outer race ring B. The internal periphery 1 of the inner race ring is initially cylindrical and of a diameter throughout its length slightly greater than the diameter of the shaft C to be connected to the bearing so that the inner race ring has a slip fit on fit on the shaft. The intermediate or body portion of the inner race has a raceway 2 for a complement of balls that also roll in the raceway 4 of the outer race ring. Preferably the zone of the inner race ring that constitutes the raceway is hardened in any suitable manner.

In accordance with the invention, one end of the race ring has an extension 5 formed with a cylindrical smooth exterior surface 6 and a circumferential shoulder 7 disposed between the raceway portion and the end of the extension. As above the indicated inner peripheral surface of the race ring including the extension is cylindrical and of a diameter to slip fit on the shaft; for example, there may be a clearance of 0.002-—0.003 of an inch between the inner periphery of the race ring and the outer peripheral surface of the shaft.

The extension had three slots 8 spaced apart equidistantly circumferentially of the extension and extending longitudinally inwardly to a point beyond the shoulder 7 and short of the raceway portion. The length of the slots will vary depending upon the size of the race ring; for example, for a race ring having an internal diameter of the order of 2.5 inches the slots should be of the order of 0.875 of an inch. The thickness of the extension will also vary with the size of the race ring; for example, for a 2.5-inch inner diameter, the thickness of the extension would be of the order of 0.25 of an inch. Preferably at the base of the shoulder 7 the extension has a circumferential groove 9. With this construction it will be seen that the portions 10 of the extension between the slots are arcuate in cross section and concentric with the shaft, are displaceable inwardly of the extension and have some inherent resiliency normally biasing them outwardly.

In accordance with the invention a continuous rigid locking collar D has an interior peripheral surface of a diameter to slide fit on said extension; for example, the interior peripheral surface of the locking collar has a diameter a few thousands of an inch greater than the normal outer diameter of the extension. Preferably, the collar has a width approximately the same as the length of the extension between the shoulder 7 and the outer end of the extension so that the collar abuts the shoulder when it is slid onto the extension. The collar has threaded therein a setscrew 11, and the collar is applied to the extension so that the setscrew engages the extension at a point approximately opposite one of the slots 8 and approximately centrally between the other two slots, as best shown in FIG. 2. When it is desired to lock the race ring on the shaft the setscrew is tightened and the inwardly displaceable portions 10 of the extension are drawn into firm concentric clamping engagement with the shaft. In other words, the tightening of the screw causes the displaceable portion 10 that is engaged by the screw to be pressed tightly and concentrically around the shaft, and at the same time the other two portions 10 are drawn tightly and concentrically into contact with the shaft. A large area of substantially uniform contact between the extension and the shaft provides an exceptionally firm mounting of the bearing on the shaft with no scoring or burring of the shaft or distortion of the extension.

Tests have shown that when the bearings locked on the shaft, it will resist a thrust load (for example, the pressure necessary to make the bearing slip longitudinally along the shaft) many times greater than can be held by the prior art bearing locking devices wherein the ring extension has two diametrically opposite slots and a collar with a setscrew thereon; and the locking device embodying the invention can be used with no danger of injury to the bearing or to the shaft.

Figure 4:
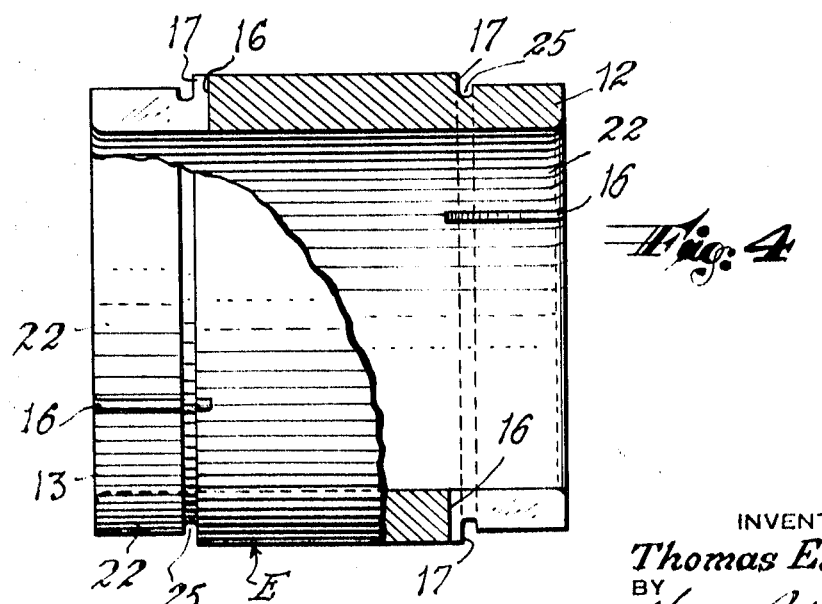
FIG. 4 is a composite side elevation and sectional longitudinal view of the inner race ring shown in FIG. 3.

The invention also contemplates the provision of a locking extension at each and of the inner race ring of any of various types of antifriction bearings mounted in different types of housings. FIGS. 3 and 4 illustrate a roller bearing wherein the inner race ring E has a slip fit on the shaft F and is provided with extensions 12 and 13, one at each end thereof. Each extension has a smooth cylindrical exterior peripheral surface, and the respective rigid continuous locking rings 14 and 15 have a slide fit on the extensions in the same manner in which the locking collar D is fitted on the extension 5. Each extension has three equidistantly circumferentially spaced slots extending longitudinally from the outer ends of the extensions inwardly beyond circumferential shoulder 17 and short of the raceway 18 with which cooperate a complement of rollers 19 that also roll in the raceway 20 of the outer ring G which is shown of the self-aligning type having a segmentally spherical outer periphery 21 which cooperates with a correspondingly shaped inner periphery of a bearing housing H.

With this construction it is also possible to assemble the bearing with two separate shaft sections one inserted into each end of the race ring, in which case the extensions and locking collars would both clamp the bearing on the shaft and couple the shaft sections together.

Preferably, but not necessarily, the slots in one extension are arranged in staggered relation to the slots in the other extension, so that any strains incident to pressing of the displaceable portions 22 between the slots against the shaft will be more evenly distributed through the race ring. Each locking collar 14 and 15 has a setscrew 23 threaded therein corresponding to and for the same purpose as the setscrew 11, and a groove 25 is provided at the base of each shoulder 17.

It is desirable to provide means for quickly orienting the setscrews with respect to the displaceable portions 22, and one possible means comprises a dimplelike depression 24 in the outer surface of one of the portions 22 approximately diametrically opposite one of the slots, said depression being of a size and shape to serve as a bearing surface for the end of the screw. A score mark or other indicium instead of or in addition to the depression may be applied to the end surface of the extension midway between two of the slots so that the operator may line up the screw with the indicium.

I claim:

1. In an antifriction bearing, a race ring having a coaxial extension on at least one side of a raceway portion which has a cylindrical smooth exterior surface and circumferential shoulder between said raceway portion and the end of said extension, said race ring and extension having a cylindrical inner surface of a diameter to slip fit on a shaft, said extension having three slots spaced apart approximately equidistantly circumferentially of the extension and extending longitudinally inwardly to a point beyond said shoulder and short of said raceway portion, providing portions between said slots that are displaceable inwardly of said extension, and a continuous rigid locking collar having an inner cylindrical peripheral surface of a diameter to a slide fit on said extension and having a setscrew threaded therein to engage said extension at a point diametrically opposite one of said slots and between the other two slots, whereby tightening of screw will cause said inwardly displaceable portions of said extension between said slots to be drawn into firm concentric clamping engagement with the shaft.

2. In an antifriction bearing as set forth in claim 1, said collar having a width approximately equal to the length of the portion of said extension between said shoulder and outer end of the extension.

3. In an antifriction bearing as set forth in claim 1, said extension having an outer circumferential groove at the base of said shoulder.

4. In an antifriction bearing as set forth in claim 2, the outer surface of at least one of said displaceable portions of the extension having a dimplelike recessed seat for the end of said screw.

5. In an antifriction bearing as set forth in claim 1, the outer surface of at least one of said displaceable portions of the extension having a dimplelike recessed seat for the end of said setscrew.